(12) United States Patent  (10) Patent No.: US 6,651,917 B2
Momoi et al.                (45) Date of Patent:     Nov. 25, 2003

(54) TAPE CARTRIDGE (75) Inventors: Akio Momoi, Tokyo (JP); Motohiko Shima, Saku (JP)

(73) Assignee: TDK Corporation, Tokyo (JP)

( * ) Notice: Subject to any disclaimer, the term of this patent is extended or adjusted under 35 U.S.C. 154(b) by 46 days.

(21) Appl. No.: 10/142,150

(22) Filed: May 10, 2002

(65) Prior Publication Data

US 2002/0175239 A1 Nov. 28, 2002

(30) Foreign Application Priority Data

May 10, 2001 (JP) ...................................... 2001-139641

(51) Int. Cl.⁷ ............................................. G11B 23/107
(52) U.S. Cl. .................... 242/348; 242/610.6; 242/611; 242/611.1; 360/132
(58) Field of Search ................................. 242/348, 342, 242/610.6, 611, 611.1, 613; 360/132

(56) References Cited

FOREIGN PATENT DOCUMENTS

JP           4-353683       12/1992

OTHER PUBLICATIONS

English Language Abstract of JP 4–353683.

*Primary Examiner*—John Q. Nguyen
(74) *Attorney, Agent, or Firm*—Greenblum & Bernstein, P.L.C.

(57) ABSTRACT

There is provided a tape cartridge which is capable of reliably preventing dropout of a magnetic tape without lowering durability. A tape cartridge includes a cartridge body formed by a pair of cartridge halves, one of the cartridge halves being formed with an insertion hole permitting insertion of a driving shaft of a record/playback apparatus, and a tape reel formed by a hollow cylindrical hub and a pair of flanges, the tape reel being accommodated within the cartridge body, with a tape wound around the hub. A center line average height Ra of a surface of the hub is defined to be not smaller than 0.005 μm and not larger than 0.04 μm.

8 Claims, 8 Drawing Sheets

| SAMPLE | CENTER LINE AVERAGE HEIGHT Ra ($\mu$m) | DROPOUT (COUNT/m) |
|---|---|---|
| EXAMPLE1 | 0.013 | 25.8 |
| EXAMPLE2 | 0.020 | 27.4 |
| EXAMPLE3 | 0.039 | 32.9 |
| COMPARATIVE EXAMPLE1 | 0.053 | 51.3 |
| COMPARATIVE EXAMPLE2 | 0.089 | 82.1 |

TAPE CARTRIDGE

BACKGROUND OF THE INVENTION

1. Field of the Invention

This invention relates to a tape cartridge having a tape reel rotatably received within a body of the tape cartridge, with a magnetic tape wound around the tape reel.

2. Description of the Related Art

As a tape cartridge of this kind, the present applicant has already developed a magnetic tape cartridge 51 shown in FIGS. 5 to 7 (hereinafter simply referred to as "the tape cartridge").

Figure 5:
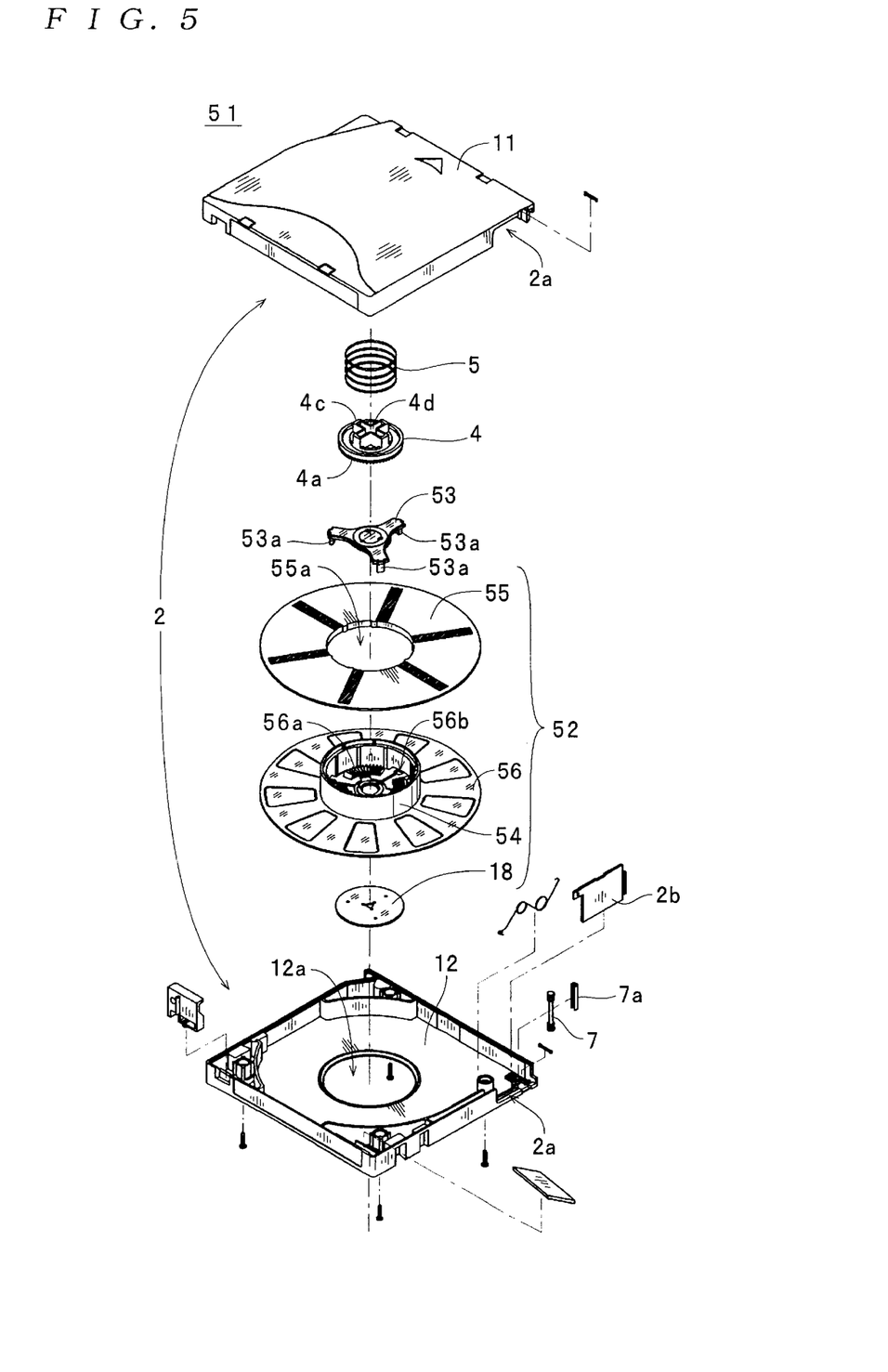
FIG. 5 is an exploded perspective view of a tape cartridge 51 already developed by the applicant.
Figure 6A:
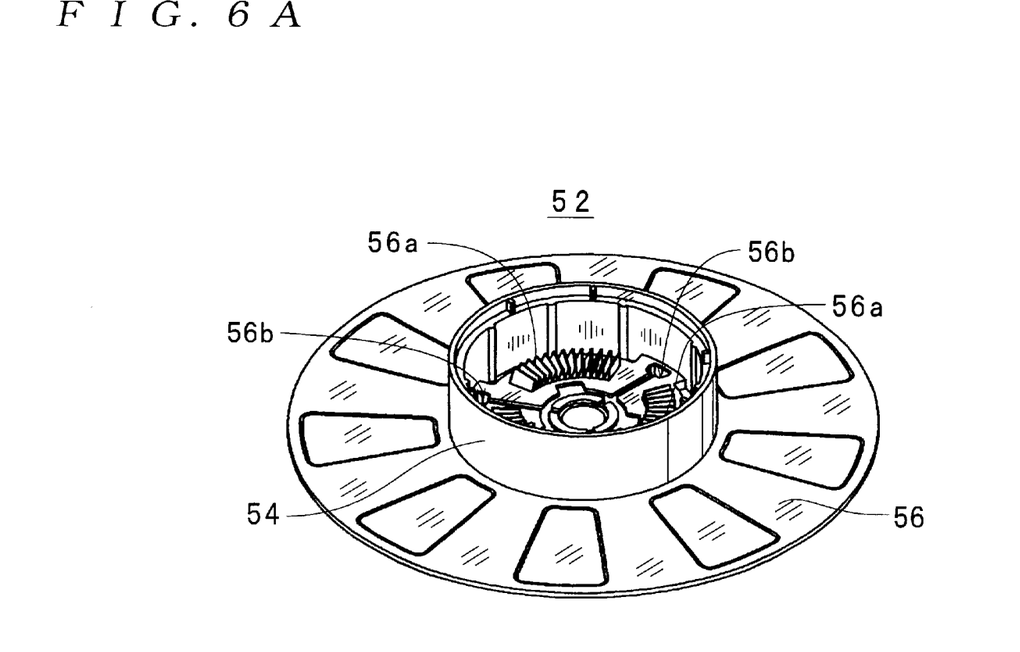
FIG. 6A is a perspective view of a lower flange 56 as viewed from a hub 54 side.
Figure 6B:
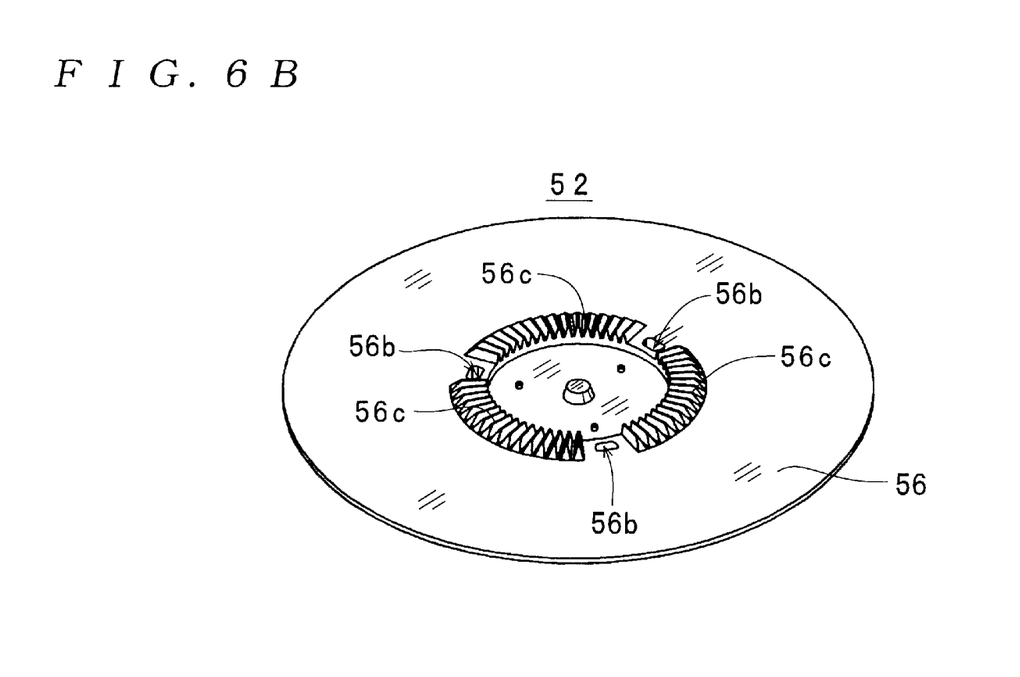
FIG. 6B is a perspective view of the lower flange 56 as viewed from a driving teeth 56c side.

As shown in FIG. 5, this tape cartridge 51 is comprised of a casing body (cartridge body) 2, a tape reel 52, a lock member 4, a spring 5, a brake release plate 53, and a pin member 7. It should be noted that the tape reel 52 has a magnetic tape wound therearound, but for ease of understanding of construction of each component, illustration of the magnetic tape is omitted. Further, a leading end of the magnetic tape is wound around the pin member 7 and fixed by a fixing tool 7a. The pin member 7 guides the magnetic tape to a take-up reel within a record/playback apparatus when it is moved along a tape traveling passage within the record/playback apparatus to the take-up reel.

As shown in FIG. 5, the casing body 2 is comprised of a pair of cartridge halves (an upper casing 11 and a lower casing 12), which are shallow plate-shaped and can be fitted to each other, and a shutter member 2b which can close a tape draw-out slot 2a formed by the upper casing 11 and the lower casing 12 when they are fitted. Further, as shown in FIG. 7, from an inner surface of the upper casing 11 perpendicularly extend four guide projections 11a, 11a, 11a, 11a for mounting the lock member 4 such that the lock member 4 cannot be rotated but is allowed to move vertically. Further, as shown in FIG. 5, the lower casing 12 has an insertion hole 12a formed therethrough for allowing a driving shaft S (see FIG. 7) of the record/playback apparatus to be inserted therein.

As shown in FIG. 5, the tape reel 52 is comprised of a hub 54, a pair of flanges (an upper flange 55 and a lower flange 56), and a metal plate 18. The hub 54 is formed to have a bottomed cylindrical shape around which a magnetic tape can be wound, and integrally formed with the lower flange 56. Further, as shown in FIG. 6A, teeth 56a for meshing with the lock member 4 are formed on an inner surface of the lower flange 56 surrounded by the hub 54, and three insertion holes 56b, 56b, 56b for mounting the brake release plate 53 in a vertically movable fashion extend to an outer surface of the lower flange 56 in a communicating fashion (see FIG. 6B). Further, as shown in FIG. 5, the upper flange 55 is formed therethrough with an insertion hole 55a allowing insertion of the lock member 4 and the brake release plate 53. Further, as shown in FIG. 6B, at a location of the outer surface of the lower flange opposed to the insertion hole 12a of the lower casing 12, driving teeth 56c, 56c, 56c are formed on an identical circumference. Further, an area inward of the driving teeth 56c, 56c, 56c, there is mounted the metal plate 18 (see FIG. 5) for causing the tape reel 52 to be magnetically attracted to the driving shaft S. The hub 54, the upper flange 55, and the lower flange 56, which form the tape reel 52 are each made by resin molding. The driving teeth 56c is demanded of a high strength since it is meshed with the driving teeth of the driving shaft S of the record/playback apparatus. Therefore, the driving teeth 56c, the hub 54, and the lower flange 56 are integrally formed from a mixed resin material in which a reinforcing material, such as a glass fiber, is mixed in a natural resin material (pure resin material not containing a pigment (opaque material which neither reacts with a material mixed therewith, nor dissolves in water or alcohol, but exhibits a certain color; an inorganic material, such as a metal salt), a dye, or a reinforcing material, the definition being applied hereinafter), such as polycarbonate. On the other hand, the upper flange 55 is not demanded of such a high strength as the lower flange 56, since the upper flange 55 is not brought into contact with the record/playback apparatus. Therefore, the upper flange 55 is formed by resin molding by using the natural resin material having no reinforcing material mixed therein. Further, the upper flange 55 is formed by using the natural resin material used in forming the lower flange 56, in view of facility of ultrasonic welding of the upper flange 55 to the lower flange 56.

Figure 7:
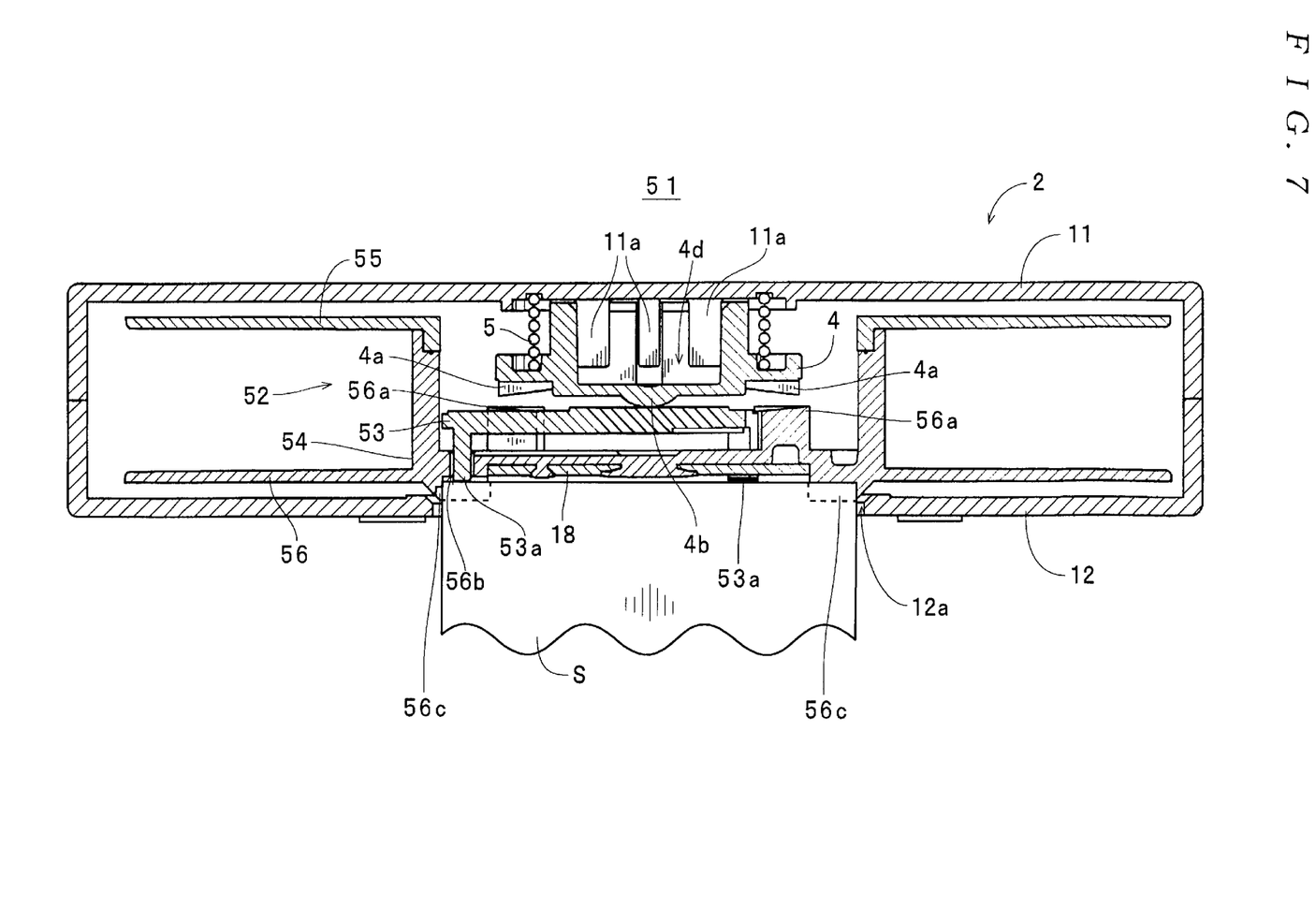
FIG. 7 is a cross-sectional view of the tape cartridge 51 in a state loaded in a record/playback apparatus (in a state in which the inhibition of rotation of a tape reel 52 by a lock member 4 is disabled)

The lock member 4 has a bottom formed with teeth 4a which can be meshed with the teeth 56a of the lower flange 56, and a protrusion 4b which can be brought into contact with a center of the brake release plate 53, as shown in FIGS. 5 and 7. Further, a positioning protrusion 4c in the shape of a cross in plan view extends perpendicularly from an upper surface of the lock member 4. In this case, the protrusion 4b has a function of decreasing the sliding resistance offered when the brake release plate 53 rotates together with the tape reel 52, by bringing the lock member 4 into point contact with the brake release plate 53. Further, the positioning protrusion 4c is formed with a guide groove 4d in the shape of a cross into which the four guide projections 11a, 11a, . . . of the upper casing 11 can be inserted. Further, by having the protrusions 11a, 11a, . . . inserted into the guide groove 4d, the lock member 4 is attached to the upper casing 11 in a rotation-inhibited but vertically movable fashion, and constantly urged toward the inner surface of the lower flange 56 (toward a brake position) by the spring 5.

The brake release plate 53 is formed as a thin flat plate from a resin material, as shown in FIG. 7, and three legs 53a, 53a, 53a which can be inserted into the insertion holes 56b, 56b, 56b of the lower flange 56 extend perpendicularly from a reverse surface thereof. The brake release plate 53 is attached to the inside of the hub 54 in a state in which the legs 53a, 53a, 53a thereof are inserted into the insertion holes 56b, 56b, 56b of the lower flange 56, respectively. Thus, the brake release plate 53 is configured such that it is vertically movable with respect to the lower flange 56 within a range of the length of the legs 53a, 53a, 53a, and at the same time, it cannot be rotated relative to the lower flange 56. Therefore, the brake release plate 53 is rotated together with the hub 54 and the lower flange 56 during rotation of the tape reel 52.

According to the tape cartridge 51, when it is taken out of the record/playback apparatus, the lock member 4 is constantly urged toward the inner surface of the lower flange 56 (toward the brake position) by the spring 5, within the casing body 2. Further, the teeth 4a of the lock member 4 and the teeth 56a of the tape reel 52 are brought into mutual contact and meshed with each other. In this state, since the teeth 4a of the lock member 4 are meshed with the teeth 56a of the tape reel 52, and at the same time, the guide protrusions 11a, 11a, . . . of the upper casing 11 are inserted into the guide groove 4d of the lock member 4, rotation of the tape reel 52 within the casing body 2 is inhibited by the lock member 4. Therefore, loosening or collapse of winding of the magnetic tape wound around the tape reel 52 within the casing body 2 is prevented. Further, in this sate, the brake release plate 53 is pressed against the inner surface of the lower flange 56 by the lock member 4 urged by the spring 5, so that the legs 53a, 53a, 53a of the brake release plate 53 extend through the insertion holes 56b, 56b, 56b of the lower flange 56 to be projected out from the outer surface of the lower flange 56.

On the other hand, when the tape cartridge 51 is loaded in the record/playback apparatus, the record/playback apparatus causes the shutter member 2b to be slid to open the tape draw-out slot 2a. Then, as shown in FIG. 7, the driving shaft 7 is magnetically attracted to the metal plate 18 of the tape reel 52, so that the driving teeth of the driving shaft S are meshed with the driving teeth 56c of the tape reel 52. At this time, the legs 53a, 53a, 53a of the brake release plate 53 are lifted upward by the driving shaft S while holding the protrusions 4b of the lock member 4 are held in point contact with the brake release plate 53. This causes the lock member 4 to be pushed upward toward the inner surface of the upper casing 11 by the guide of the guide protrusions 11a, 11a, . . . . As a result, the meshing of the teeth 4a of the lock member 4 with the teeth 56a of the lower flange 56 is released, thereby allowing rotation of the tape reel 52. Subsequently, the tape reel 52 is rotated along with rotation with the driving shaft S. At this time, the magnetic tape wound around the tape reel 52 is drawn out of the tape draw-out slot 2a by the record/playback apparatus, whereby various recording data are recoded on or read from the magnetic tape.

This tape cartridge 51, however, has the following points which should be improved: In this tape cartridge 51, to increase the strength of the driving teeth 56c of the tape reel 52 for meshing with the driving teeth of the driving shaft S, the lower flange 56 and the hub 54 which are integrally formed with the driving teeth 56c are formed by using the mixed resin material in which the reinforcing material is mixed in the natural resin material. The driving teeth 56c, the lower flange 56, and the hub 54 formed by using the mixed resin material have minute irregularities on their surfaces due to inclusion of the reinforcing material in the mixture, which degrades smoothness of the surfaces. This may produce transferred wrinkles of the magnetic tape wound around the hub due to the irregularities formed on the surface of the hub 54, and if the transferred wrinkles are large, they can increase signal dropout. At present, the dropout caused by the transferred wrinkles do not raise problems in the market (among users). However, to provide for the high-density data recording in the future, it is preferable to improve the tape cartridge such that occurrence of transferred wrinkles is prevented for further reduction of the dropout for the tape cartridge.

SUMMARY OF THE INVENTION

It is a main object of the invention to provide a tape cartridge which is capable of reliably preventing dropout of a magnetic tape without lowering durability thereof.

(1) To attain the above object, a tape cartridge according to the present invention includes a cartridge body formed by a pair of cartridge halves, one of the cartridge halves being formed with an insertion hole permitting insertion of a driving shaft of a record/playback apparatus, and a tape reel formed by a hollow cylindrical hub and a pair of flanges, the tape reel being accommodated within the cartridge body, with a tape wound around the hub, wherein a center line average height Ra of a surface of the hub is defined to be not smaller than 0.005 μm and not larger than 0.04 μm. Here, the center line average height Ra is a surface roughness defined in JIB B 0601 (ISO 486:82, 3274:75, 4287-1:84, 4287-2:84; 4288:85).

According to this tape cartridge, by defining the center line average height Ra of the surface of the hub to be not smaller than 0.005 μm and not larger than 0.04 μm, it is possible to maintain an excellent smoothness of the surface of the hub. Therefore, occurrence of dropout of the magnetic tape can also be prevented due to the excellent smoothness of the hub, whereby reliability of the tape cartridge can be enhanced.

(2) In this case, it is preferred that the center line average height Ra of the surface of the hub is defined to be not smaller than 0.005 μm and not larger than 0.02 μm. This makes it possible to secure a sufficient margin for the requirement of smoothness, so that it is possible to realize the tape cartridge 1 having a high reliability which is hard to suffer dropout even under severer use conditions. Further, it is possible to realize a tape cartridge which can maintain a high reliability over a long term.

(3) Further, by forming the hub from a natural resin material, the center line average height Ra of the surface of the hub can be reliably and easily set to a value not smaller than 0.005 μm and not larger than 0.02 μm. This enables the smoothness of the surface of the hub to be reliably maintained in an excellent condition.

(4) To attain the above object, a tape cartridge according to the present invention includes a cartridge body formed by a pair of cartridge halves, one of the cartridge halves being formed with an insertion hole permitting insertion of a driving shaft of a record/playback apparatus, and a tape reel formed by a hollow cylindrical hub and a pair of flanges, the tape reel being accommodated within the cartridge body, with a tape wound around the hub, and the one flange located on a side of the insertion hole has a surface opposed to the insertion hole, the surface being formed with driving teeth for meshing with the driving shaft, and is formed from a mixed resin material in which a reinforcing material is mixed in a natural resin material, the hub being formed integrally with the other flange, from a natural resin material.

According to the tape cartridge, by forming the one flange located on a side of the insertion hole integrally with driving teeth for meshing with the driving shaft, from a mixed resin material, and at the same time forming the other flange integrally with the hub, from a natural resin material, it is possible to increase the strength of the driving teeth, and hence maintain a high durability of the cartridge. Moreover, since the center line average height Ra of the surface of the hub can be reliably made not larger than 0.02 μm, it is possible to maintain the smoothness of the surface of the hub in an excellent condition. Therefore, it is possible to provide a tape cartridge having an excellent durability which does not incur wear or deformation of the driving teeth. Further, due to the excellent smoothness of the surface of the hub, occurrence of dropout of the magnetic tape can be prevented, thereby enhancing the reliability of the tape cartridge.

(5) Further, as the natural resin material, it is preferable to use PC (polycarbonate), PA (nylon (generic name of a long-chain polyamide having repetition of a polyamide group as an indispensable part of a main chain of a polymer)), PBT (polybutylene terephthalate), or PPS (polyphenylene sulfide). These natural resin materials are inexpensive materials, so that it possible to construct the hub at a low cost while maintaining the smoothness of the surface of the hub.

(6) Further, it is preferable to use, as the reinforcing material, a glass fiber, a carbon fiber, or a metal powder.

These reinforcing materials are inexpensive materials, and hence the durability of the one flange and driving teeth can be enhanced without increasing the manufacturing costs of the tape cartridge.

It should be noted that the disclosure of the present specification relates to the subject included in Japanese Patent Application No. 2001-139641 which was filed on May 10, 2001, and all of the disclosure thereby is expressly incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENT

Hereafter, a preferred embodiment of the present invention will be described with reference to the drawings.

First, the construction of a tape cartridge 1 will be described with reference to drawings.

Figure 1:
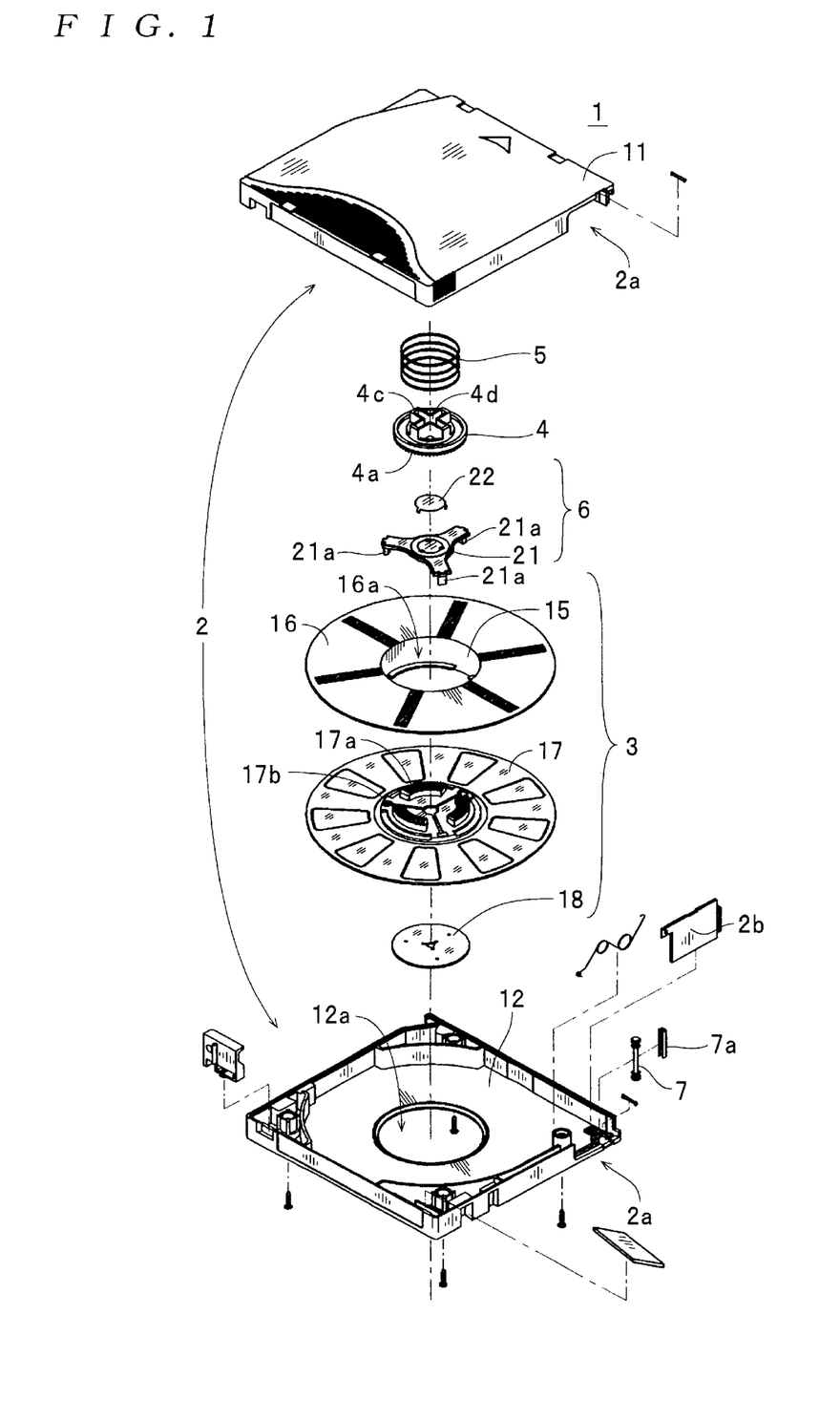
FIG. 1 is an exploded perspective view of a tape cartridge according to a first embodiment of the invention.

The tape cartridge 1 is a single-reel cartridge type recording medium which is used e.g. as a backup medium for preserving data recorded in a main recording medium for a computer, and as shown in FIG. 1, comprised of a casing body (cartridge body) 2 formed by an upper casing (the other cartridge half) 11 and a lower casing (one cartridge half) 12, a tape reel 3, a lock member 4, a spring 5, a brake release plate 6, and a pin member 7. In this case, except for the tape reel 3 and the brake release plate 6, the tape cartridge 1 has the same construction as the tape cartridge 51. Therefore, while indicating identical component parts by identical reference numerals and omitting detailed description thereof, different components will be mainly described.

Figure 2:
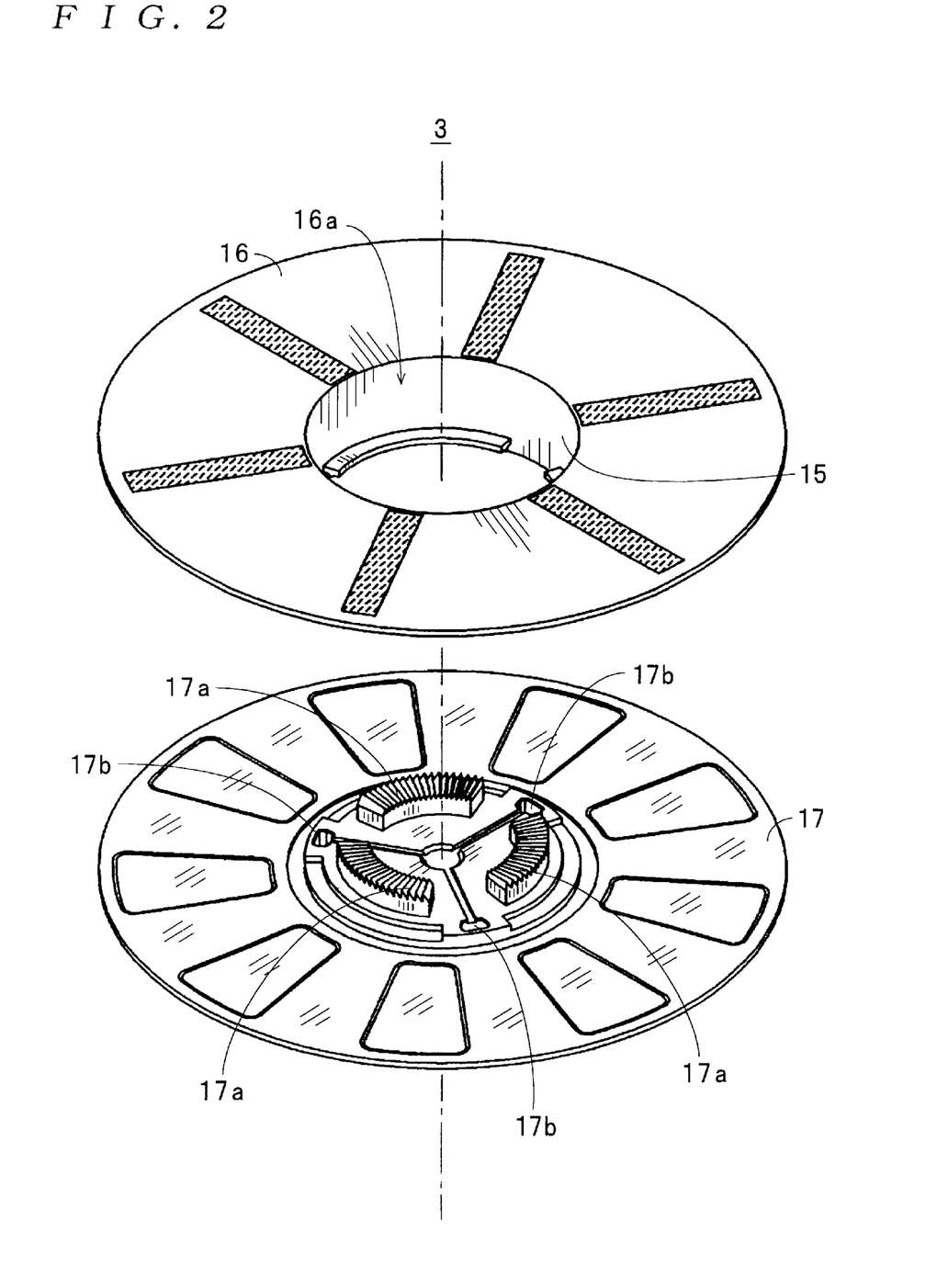
FIG. 2 is an enlarged perspective view of a tape reel 3 as viewed from an upper flange 16 side.
Figure 3:
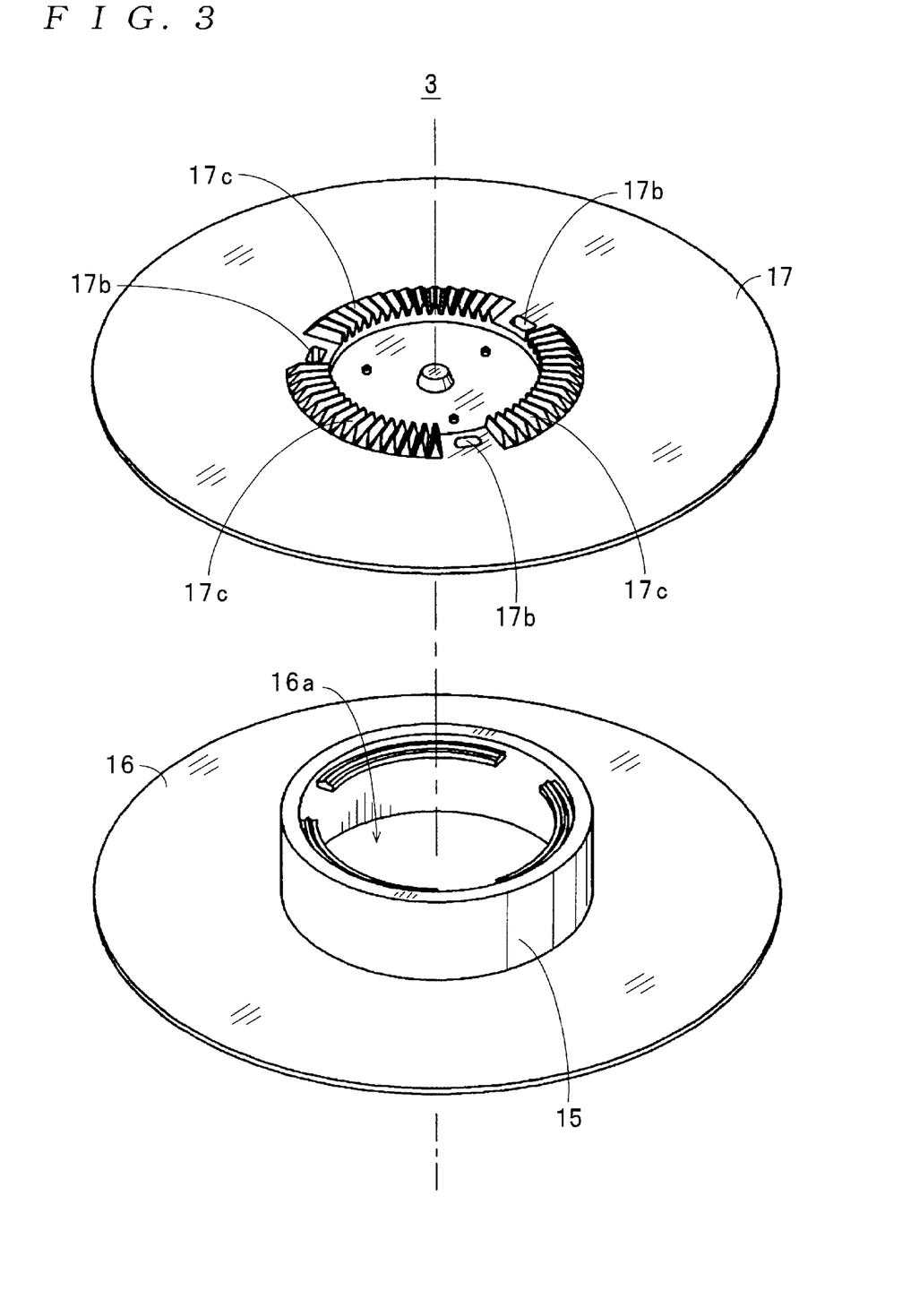
FIG. 3 is an enlarged perspective view of the tape reel 3 as viewed from a lower flange 17 side.
Figure 4:
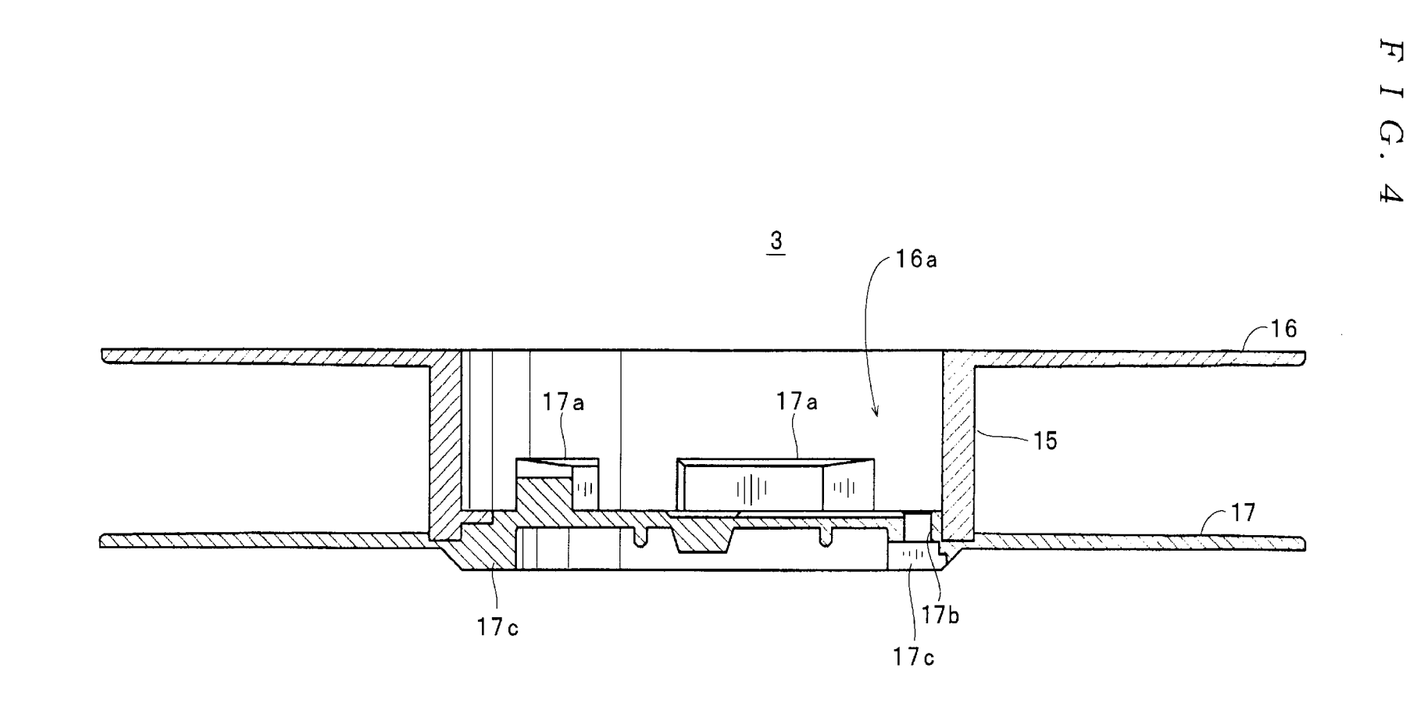
FIG. 4 is a sectional view taken on a plane containing a center line of the tape reel 3.

The tape reel 3 is comprised of a hub 15, a pair of flanges (an upper flange 16 and a lower flange 17), and a metal plate 18. As shown in FIGS. 1 to 4, the hub 15 is formed to have a bottomed cylindrical shape around which a magnetic tape can be wound, and integrally formed with the upper flange 16. Further, as shown in FIGS. 2 and 4, teeth 17a for meshing with a teeth 4a of the lock member 4 are formed on an inner surface of the lower flange 17, and as shown in FIG. 3, three insertion holes 17b, 17b, 17b for mounting the brake release plate 6 in a vertically movable fashion extends to an outer surface of the lower flange 17 in a communicating fashion. Further, as shown in FIGS. 1 and 4, the upper flange 16 is formed therethrough with an insertion hole 16a allowing insertion of the lock member 4 and the brake release plate 6. Further, on the upper flange 16, a hub 15 is formed such that it extends perpendicularly from the rim of opening of the insertion hole 16a. Further, as shown in FIG. 3, at a location of the outer surface of the lower flange 17, driving teeth 17c, 17c, 17c for meshing with driving teeth of the driving shaft S of a record/playback apparatus are formed on an identical circumference. Further, at a location of the outer surface of the lower flange 17 surrounded by the driving teeth 17c, there is attached a metal plate 18 for causing the tape reel 3 to be magnetically attracted the driving shaft S.

The hub 15, the upper flange 16, and the lower flange 17, which form the tape reel 3 are each made by resin molding. In this case, the driving teeth 17c are demanded of a high strength since they are meshed with the driving teeth of the driving shaft S of the record/playback apparatus. Therefore, the lower flange 17 integrally formed with the driving teeth 17c is formed from a mixed resin material in which a reinforcing material (a glass fiber, a carbon fiber or a metal powder) is mixed in a natural resin material (resin material, such as pure polycarbonate, nylon, polybutylene terephthalate, or polyphenylene sulfide). On the other hand, the upper flange 16 and the hub 15 integrally formed therewith are not demanded of such a high strength as the lower flange 17, since they are not brought into contact with the record/playback apparatus. Therefore, the upper flange 16 and the hub 15 are formed from a natural resin material. Thus, the hub 15 is configured such that the smoothness of the surface thereof is ensured. For example, when the hub 5 is formed by using polycarbonate out of the above-mentioned resin materials, as the natural resin material, the surface of the hub 15 has a center line average height Ra of about 0.013 $\mu$m, which ensures a sufficient smoothness. Further, even when other natural resin materials are used, the center line average height Ra of the surface of the hub 15 is suppressed to 0.02 $\mu$m or less, which ensures an excellent smoothness. It should be noted that even when the center line average height Ra on the surface of the hub 15 exceeds 0.02 $\mu$m, so long as it is not larger than 0.04 $\mu$m, a sufficient smoothness can be ensured. In this case, the smaller the center line average height Ra on the surface of the hub 15, the better it is, but in view of the cost of making a molding die therefor and machining accuracy, it is considered that the center line average height Ra has a limit of 0.005 $\mu$m. Further, in view of facility of ultrasonic welding to the lower flange 17, the upper flange 16 and the hub 15 are made of the same kind of a natural resin material as used for the lower flange 17. It should be noted that an additive, such as a dye can be added to the above-mentioned natural resin material, so long as it does not impair smoothness of the hub 15.

As shown in FIG. 1, the brake release plate 6 is formed by assembling a release plate body 21 made of resin and a disc 22 of a stainless steel plate subjected to surface plating, into one-piece member. Further, the brake release plate 6 is mounted such that it cannot be rotated with respect to the lower flange 17 but can be vertically moved relative thereto, and during rotation of the tape reel 3, it is rotated together with the lower flange 17. As shown in FIG. 1, the disc 22 is mounted on a top of the brake release plate body 21, and from a reverse surface of the brake release plate body 21 perpendicularly extend three legs 21a, 21a, 21a which can be inserted into the insertion holes 17b, 17b, 17b of the lower flange 17.

Next, the operation of the inside of the tape cartridge 1 during the use thereof will be described with reference to FIG. 1.

According to the tape cartridge 1, when it is taken out of the record/playback apparatus, the lock member 4 is constantly urged toward the inner surface of the lower flange 17 (toward the brake position) by the spring 5, within the casing body 2, whereby the teeth 4a of the lock member 4 and the teeth 17a of the tape reel 3 are brought into mutual contact and meshed with each other. In this state, since the teeth 4a of the lock member 4 are meshed with the teeth 17a of the tape reel 3, and at the same time, the guide protrusions 11a, 11a, . . . of the upper casing 11 are inserted into the guide groove 4d of the lock member 4, the rotation of the tape reel 3 within the casing body 2 is inhibited by the lock member 4. Therefore, loosening or collapse of winding of the magnetic tape wound around the tape reel 3 within the casing body 2 is prevented. Further, in this state, the brake release plate 6 is pressed against the inner surface of the lower flange 17 by the lock member 4 urged by the spring 5, so that the legs 21a, 21a, 21a of the brake release plate 6 extend through the insertion holes 17b,17b, 17b of the lower flange 17 to be projected out from the outer surface of the lower flange 17.

On the other hand, when the tape cartridge 1 is loaded in the record/playback apparatus, similarly to the tape cartridge 51, the driving teeth of the driving shaft S are meshed with the driving teeth 17c of the tape reel 3. At this time, the legs 21a, 21a, 21a of the brake release plate 6 are lifted upward by the driving shaft S while holding the protrusions 4b of the lock member 4 in point contact with the brake release plate 6. This causes the lock member 4 to be pushed upward toward the inner surface of the upper casing 11 by the guide of the guide protrusions 11a, 11a, . . . . As a result, the meshing of the teeth 4a of the lock member 4 with the teeth 17a of the lower flange 17 is released, thereby allowing rotation of the tape reel 3. Subsequently, the tape reel 3 is rotated along with rotation with the driving shaft S. Thereafter, similarly to the tape cartridge 51, various recording data are recorded on or read from the magnetic tape.

As describe above, according to the tape cartridge 1, the lower flange 17 and the driving teeth 17c are integrally molded by using the mixed resin material in which the reinforcing material is mixed in the natural resin material, whereby the lower flange 17 and the driving teeth 17c has a high strength and excellent wear-resistant properties. Therefore, when the tape reel 3 is rotated with the driving teeth 17c in mesh with the driving teeth of the driving shaft S, it is possible to reliably transmit rotation of the driving shaft S to the tape reel 3 without degrading durability of the tape cartridge over a long term. Further, by integrally forming the upper flange 16 and the hub 15 by using the natural resin material without having the reinforcing material mixed therein, the center line average height Ra of the surface of the hub 15 can be made not larger than 0.02 $\mu$m. This enables the surface of the hub 15 to be formed smooth without producing small irregularities thereon. Therefore, when a magnetic tape is wound around the hub 15, occurrence of transferred wrinkles on the magnetic tape can be prevented, whereby the tape cartridge with high reliability can be realized which is hard to suffer dropout.

Next, the present invention will be described in detail based on examples.

Figure 8:
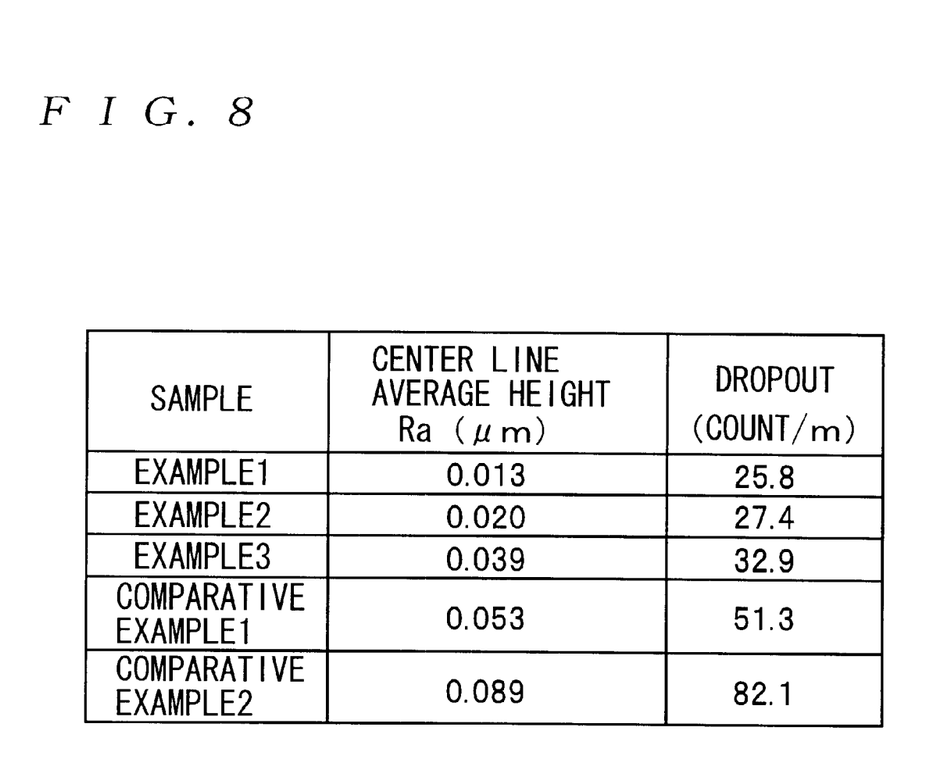
FIG. 8 is a diagram showing results of measurement of dropout carried out on Examples and Comparative Examples.

Samples (of a unitary member of the hub 15 and the upper flange 16 integrally formed) having various values of center line average height Ra as shown in FIG. 8 are produced by injection molding of resin materials which are changed from one example to another. More specifically, by using various natural resin materials, there are formed a first sample group (Examples 1 and 2) whose center line average height Ra of the surface is defined to be not larger than 0.02 $\mu$m. Further, by using mixed resin materials in which a pigment and a reinforcing material having very small particle diameters are mixed in a natural resin material, there are formed a second sample group (in this embodiment, only Example 3 is shown by way of example) whose center line average height Ra of the surface is defined to be larger than 0.02 $\mu$m and not larger than 0.04 $\mu$m. Further, by using mixed resin materials in which a pigment and a reinforcing material having larger particle diameters are mixed in a natural resin material, there are formed a third sample group (Comparative Examples 1 and 2) whose center line average height Ra of the surface is larger than 0.04 $\mu$m.

A plurality of tape reels 3 were produced by using these samples, and a magnetic tape for LTO (Linear Tape Open) having a thickness of 8.9 $\mu$m and a length of 609 m was wound around each reel 3. Then, an environmental storage test was carried out by leaving each tape reel having the magnetic tape wound therearound under an environment of a temperature of 50° C. and a relative humidity RH of 80% for five days. Then, after the test, the dropout characteristic of the magnetic tape wound around each tape reel 3 was measured by using a ½-inch tape tester (manufactured by TDK). The dropout was measured by recording a single sinusoidal signal of 5.3 MHz at a tape feed speed of 2.4 m/second on the magnetic tape with a head for DLT2000XT, and then counting each occurrence of a reproduction level drop by 3 dB or more during playback of the recorded single sinusoidal signal to thereby detect a number of occurrences of the drop per one-meter length of the tape.

As shown in FIG. 8 which illustrates results of the measurement, the samples of the first sample group showed counts of smaller than 28, i.e. very excellent results. Further, the second group showed a count of smaller than 33, a sufficiently small value. On the other hand, the samples of the third group showed counts of larger than 50. The test results shows that it is possible to realize the tape cartridge 1 having a high reliability which is hard to suffer dropout under normally expected use conditions, by making the center line average height Ra of the surface of the hub 15 not larger than 0.04 $\mu$m. Further, by making the center line average height Ra of the surface of the hub 15 not larger than 0.02 $\mu$m, it is possible to secure a sufficient margin for the requirement of smoothness, so that it is possible to realize the tape cartridge 1 having a high reliability which is hard to suffer dropout even under severer use conditions over a long term.

It should be noted that the present invention is not limited to the above embodiment, but various modifications thereto are possible as required. For example, although in the present embodiment, the description is given taking an example of the braking structure in which when the tape cartridge 1 is taken out of the record/playback apparatus, the teeth 17a formed on the inner surface of the lower lounge 17 and the teeth 4a formed on the bottom of the lock member 4 are meshed with each other, thereby inhibiting rotation of the tape reel 3 within the casing body 2, this is not limitative, but the present invention is applicable to a case of using a braking structure in which the teeth 17a are formed on the outer peripheral surface of the lower flange 17. That is, similarly to the tape cartridge 1, the hub 15 and the upper flange 16 are integrally formed by using a natural resin material without a reinforcing material mixed therein, and at the same time, the lower flange 17 and the driving teeth 17c are formed from a mixed rein material in which a reinforcing material is mixed in a natural resin material, whereby the smoothness of the surface of the hub 15 can be maintained at an excellent level while maintaining a high strength of the driving teeth 17c.

What is claimed is:

1. A tape cartridge including a cartridge body formed by a pair of cartridge halves, one of the cartridge halves being formed with an insertion hole permitting insertion of a driving shaft of a record/playback apparatus, and a tape reel formed by a hollow cylindrical hub and a pair of flanges, the tape reel being accommodated within the cartridge body, with a tape wound around the hub, wherein a center line average height Ra of a surface of the hub is defined to be not smaller than 0.005 µm and not larger than 0.04 µm.

2. A tape cartridge according to claim 1, wherein the center line average height Ra of the surface of the hub is defined to be not smaller than 0.005 µm and not larger than 0.02 µm.

3. A tape cartridge according to claim 2, wherein the hub is formed of a natural resin material.

4. A tape cartridge according to claim 3, wherein as the natural resin material, there is used polycarbonate, polyamide, polybutylene terephthalate, or polyphenylene sulfide.

5. A tape cartridge including a cartridge body formed by a pair of cartridge halves, one of the cartridge halves being formed with an insertion hole permitting insertion of a driving shaft of a record/playback apparatus, and a tape reel formed by a hollow cylindrical hub and a pair of flanges, the tape reel being accommodated within the cartridge body, with a tape wound around the hub, wherein the one flange located on a side of the insertion hole has a surface opposed to the insertion hole, the surface being formed with driving teeth for meshing with the driving shaft, and is formed from a mixed resin material in which a reinforcing material is mixed in a natural resin material, and wherein the hub is formed integrally with the other flange, from a natural resin material.

6. A tape cartridge according to claim 5, wherein as the natural resin material, there is used polycarbonate, polyamide, polybutylene terephthalate, or polyphenylene sulfide.

7. A tape cartridge according to claim 5, wherein as the reinforcing material, there is used a glass fiber, a carbon fiber, or a metal powder.

8. A tape cartridge according to claim 6, wherein as the reinforcing material, there is used a glass fiber, a carbon fiber, or a metal powder.

* * * * *